(12) United States Patent
Bill (10) Patent No.: US 11,814,189 B2
(45) Date of Patent: Nov. 14, 2023

(54) INTERNAL TIRE AND/OR WHEEL MONITORING DEVICE AND METHOD

(71) Applicant: AIRBUS OPERATIONS LIMITED, Bristol (GB)

(72) Inventor: Andrew Bill, Bristol (GB)

(73) Assignee: Airbus Operations Limited, Bristol (GB)

(*) Notice: Subject to any disclaimer, the term of this patent is extended or adjusted under 35 U.S.C. 154(b) by 234 days.

(21) Appl. No.: 17/166,534

(22) Filed: Feb. 3, 2021

(65) Prior Publication Data

US 2021/0237896 A1    Aug. 5, 2021

(30) Foreign Application Priority Data

Feb. 4, 2020    (GB) ..................... 2001487

(51) Int. Cl.
*B64D 45/00* (2006.01)
*H04W 4/38* (2018.01)
*B64C 25/34* (2006.01)

(52) U.S. Cl.
CPC .......... *B64D 45/0005* (2013.01); *B64C 25/34* (2013.01); *H04W 4/38* (2018.02); *B64D 2045/008* (2013.01)

(58) Field of Classification Search
None
See application file for complete search history.

(56) References Cited

U.S. PATENT DOCUMENTS

| 9,248,706 | B2* | 2/2016 | Jankowski | B60C 23/00 |
| 9,821,614 | B1 | 11/2017 | Brown | |
| 11,046,127 | B2* | 6/2021 | Yamada | B60C 23/04 |
| 11,110,758 | B1* | 9/2021 | Dages | B60C 23/0483 |
| 2006/0220812 | A1* | 10/2006 | Luce | B60C 23/04985 |
| | | | | 73/146 |
| 2008/0055060 | A1* | 3/2008 | Logan | B60C 23/0444 |
| | | | | 340/447 |
| 2008/0132859 | A1* | 6/2008 | Pires | A61F 13/42 |
| | | | | 604/361 |
| 2008/0297325 | A1* | 12/2008 | Torstensson | A61B 5/00 |
| | | | | 340/10.42 |
| 2009/0005748 | A1* | 1/2009 | Ales | A61F 13/42 |
| | | | | 604/361 |

(Continued)

FOREIGN PATENT DOCUMENTS

| BR | 112019027288 A2 * | 7/2020 | B60C 23/04 |
| CA | 3067736 A1 * | 12/2018 | B60C 23/04 |

(Continued)

OTHER PUBLICATIONS

International Search Report cited in EP 21 15 4909 dated Jun. 14, 2021, 18 pages.
Search Report for GB2001487.4, dated Jul. 8, 2020, 7 pages.

*Primary Examiner* — Fekadeselassie Girma
(74) *Attorney, Agent, or Firm* — Nixon & Vanderhye P.C.

(57) ABSTRACT

An apparatus for monitoring a tire and/or a wheel including a sensor system; a wireless communication interface; a processor connected to the sensor system and the wireless communication interface; a power source; and a mounting system for attaching the apparatus to a wheel. The mounting system is configured to allow movement of the sensor system relative to the wheel in use.

20 Claims, 6 Drawing Sheets

(56) References Cited

U.S. PATENT DOCUMENTS

| | | | |
|---|---|---|---|
| 2009/0015416 A1* | 1/2009 | Liu | B60C 23/04985 340/693.9 |
| 2009/0319121 A1* | 12/2009 | MacDonald | G01M 17/007 701/31.4 |
| 2015/0183281 A1* | 7/2015 | Deniau | B60C 29/005 73/146.8 |
| 2017/0045409 A1* | 2/2017 | Cousins | G01M 1/125 |
| 2021/0125428 A1* | 4/2021 | Tedesco | G07C 5/0808 |
| 2021/0148790 A1* | 5/2021 | Ziehl | G01L 1/146 |
| 2021/0178839 A1* | 6/2021 | Deniau | B60C 23/0479 |

FOREIGN PATENT DOCUMENTS

| | | | | |
|---|---|---|---|---|
| CA | 3038100 A1 * | 11/2019 | | A01B 49/027 |
| CN | 109070666 A * | 12/2018 | | |
| CN | 109866560 A | 6/2019 | | |
| CN | 209274286 U * | 8/2019 | | |
| DE | 19529289 A1 * | 2/1997 | | |
| DE | 10 2008 060 542 | 6/2010 | | |
| DE | 102008060542 B3 * | 6/2010 | | |
| DE | 10 2010 037597 | 3/2012 | | |
| EP | 0233357 A1 * | 8/1987 | | |
| EP | 1508458 A1 * | 2/2005 | | |
| EP | 2 910 393 | 8/2015 | | |
| EP | 3 069 903 | 9/2016 | | |
| EP | 3 243 673 | 11/2017 | | |
| EP | 3 275 701 | 1/2018 | | |
| EP | 3 498 501 | 6/2019 | | |
| EP | 3584094 A1 * | 12/2019 | | |
| EP | 3584530 A1 * | 12/2019 | | B60C 11/243 |
| GB | 2001487 A * | 1/1979 | | H02M 1/36 |
| GB | 2 426 061 | 11/2006 | | |
| JP | 2004 284396 | 10/2004 | | |
| KR | 20050121564 A * | 12/2005 | | |
| KR | 100666796 B1 * | 1/2007 | | |
| WO | WO-9729919 A1 * | 8/1997 | | |
| WO | WO-2014056793 A1 * | 4/2014 | | G01M 17/04 |

* cited by examiner

INTERNAL TIRE AND/OR WHEEL MONITORING DEVICE AND METHOD

RELATED APPLICATION

This application claims priority to United Kingdom patent application GB2001487.4 filed Feb. 4, 2020, the entirety of which is incorporated by reference.

TECHNICAL BACKGROUND

The present disclosure relates to tire and/or wheel monitoring devices, and methods of their use. In examples, the present disclosure relates to aircraft tire and/or wheel monitoring devices.

BACKGROUND

Checking tire pressure is an important part of the maintenance of a vehicle. Tire pressures should be maintained at predetermined pressures to ensure that a tire performs as intended by the manufacturer. Incorrect tire pressure can lead to a tire failing, perhaps bursting and causing damage to the vehicle and/or a loss of control. Due to the high speeds encountered by the tires on aircraft landing gear, pressures are checked regularly, perhaps once a day or more frequently.

It has been proposed to automate tire pressure measurement by included a sensing device on a wheel which can then be interrogated wirelessly to provide a measurement of tire pressure. Such sensing devices are provided by attaching to a sensor port on the wheel which is accessible externally of the wheel. In this case it is not possible to measure gas temperature directly and any temperature sensing is indirect, for example measuring the temperature of a body of the sensing device and not the actual gas temperature. Aircraft tires can reach high temperatures from the large tire deflections and high brake temperatures during landing, it is therefore useful to have an accurate measurement of gas temperature to allow a measured pressure to be expressed as a pressure at a reference temperature. Mounting a device to a sensor port fixes the device at a single position relative to the wheel.

Tire maintenance procedures often rely on manual input and results may be dependent on a skill of a maintenance operative or difficult to detect manually. For example, the condition of a tire may be inspected visually, but it can be difficult early stages of damage and deterioration which is not clearly visible and internal damage which may not be visible externally.

Tires are also affected by vehicle loading and it can be useful to have an accurate measurement of vehicle loading, for example to ensure that a maximum takeoff weight is not exceeded.

It would be desirable to provide a monitoring system which addresses some, or all, of these points.

SUMMARY

According to a first aspect of the present invention, there is provided an apparatus for monitoring at least one of a tire and a wheel. The apparatus comprises: a sensor system; a wireless communication interface; a processor connected to the sensor system and the wireless communication interface; a power source; and a mounting system for attaching the apparatus to a wheel and configured to allow movement of the sensor system relative to the wheel in use.

By allowing the sensor to move relative to the wheel in use, a number of monitoring functions can be carried out. Rather than being limited to a single fixed position on a wheel, the monitoring system can use the sensor at different positions relative to the wheel, or at a known position relative to other features, such as the ground, to increase the range of monitoring provided.

The wireless communication system is for transmitting data from the sensor system and/or data resulting from processing data of the sensor system, such as an indication of a tire condition or a parameter which is calculated based on the output of the sensor system. The connection of the processor to the other elements can be direct or indirect, for example using a data bus. In use, the processor can control sensor system to take measurements, process the measurements and cause transmission of the measurements or results based on the measurements. Reference to a "processor" includes application-specific integrated circuits (ASICs), processing systems comprising two or more processors or processing cores, as well as programmable controllers, such as microcontrollers, and any other integrated circuit suitable for controlling the sensor system and processing the data.

In some examples, the power source comprises a battery, possibly rechargeable via a wireless charging system or via an energy harvesting system. Where the power source is a battery it may have a capacity sufficient to power the apparatus for at least 1 month, 2 months, 3 months, 6 months, 1 year, 2 years or 3 years. In other examples, the power source may comprise an energy harvesting system, possibly also comprising a capacitor for storing harvested energy from vibration in use. Suitable energy harvesting systems include those converting rotation, vibration and heat differentials into electrical energy. In other examples, the power source may include a wireless power system, such as power transferred by radio frequency electromagnetic waves.

The movement of the sensor system relative to the wheel in use may be a rotation about an axis, for example a rotational axis of a wheel on which the apparatus is mounted.

The mounting system may be configured to attach the apparatus inside a tire. This can allow parameters such as tire gas temperature to be sensed directly and may provide some protection to the apparatus. In use, the apparatus may be entirely contained within a tire affixed to a wheel.

The mounting system can take several different forms. In one example, the mounting system defines a track around a wheel and the sensor system can translate along the track. The track can be circumferential around the wheel or be substantially circular.

In another example of a mounting system, the mounting system comprises a carriage for engaging a circumferential track provided on the wheel. The carriage may be part of a housing for the sensor system, wireless communication interface, processor and power source. The track may be substantially circular with a center on the axis of rotation of the wheel.

In a further example of a mounting system, the mounting system comprises a hoop-shaped band for mounting around a wheel, such that the hoop-shaped band can rotate about the wheel in use. Here the components of the apparatus are fixed relative to the band and the band itself rotates about the wheel axis. For example, the band can have a low static coefficient of friction with the wheel, for example less than 0.5, less than 0.4, or less than 0.3, between the band and wheel. A low static coefficient of friction can be achieved by manufacturing the band from a suitable material which has a suitably low static coefficient of friction with the material of the wheel. Alternatively, or additionally, the band could have a coating of a low friction material to reduce the static coefficient of friction, for example polytetrafluoroethylene (PTFE).

Regardless of its specific construction, mounting system can be configured to allow the sensor system to move relative to the wheel under the action of gravity so as to maintain the sensor system at a bottom of the wheel in use at least for wheel rotation speeds less than 60 revolutions per minute. For example, the mounting system might include bearings or low friction parts so that the force of gravity moves the sensor system to the bottom of the wheel. The bottom of the wheel is the part of the wheel closest to the ground and can enable measurements of tire deflection to be taken, for example to determine aircraft loading. By maintaining the position during rotation of the wheel, the sensor system can also scan an entire tire and/or wheel as the wheel rotates to allow a parameter of a whole tire and/or wheel to be sensed. The reference to wheel speeds less than 60 revolutions per minute translates to a speed lower than about 15 km/h for an aircraft with 1.3 m diameter tires, corresponding to a slow taxi speed. The mounting system may maintain the sensor system at the bottom of the wheel at speeds greater than this, but as rotation speed increases the centripetal force will tend to hold the sensor in the same position relative to the wheel.

Some examples may include a drive to move the sensor system around the wheel, alternatively or additionally to the use of gravity. For example, a drive can allow an entire tire interior to be scanned when the aircraft is stationary, or for the sensor system to be maintained at a predetermined absolute orientation, such as pointing down, with greater accuracy (swinging effects may be reduced).

The apparatus can include any suitable sensor in the sensor system. For example, the sensor system may comprise at least one of: a pressure sensor, a temperature sensor, an accelerometer, a capacitance sensor, an optical sensor, a radio frequency sensor, an infrared sensor, a range sensor and an ultrasound sensor.

According to another aspect of the invention, there is provided a system comprising a wheel; a tire affixed to the wheel; and an apparatus as described above, with or without the optional features also described. The apparatus is positioned inside the tire. In this context "inside the tire" means inside the cavity which is filled with gas to inflate the tire, such as the cavity which is delimited by an outer surface of the wheel and an inner surface of the tire. In such a system, in use and with the wheel at rest, the sensor system may be positioned at the bottom of the wheel under the action of gravity. The system may form part of an aircraft, for example all the wheels of the aircraft can each comprise the system to allow all tires to be monitored. When all tires are monitored on an aircraft it is also possible to determine the center-of-gravity, which is useful for a pilot and may be provided as an input to aircraft control systems.

According to another aspect of the invention, there is provided a method of monitoring a tire on a vehicle. The method comprises: providing a sensor system inside the tire and mounted for movement relative to the tire; measuring a parameter of the tire using the sensor system; and using the measured parameter to determine a characteristic of the tire or the vehicle. Such a method can allow monitoring of more tire parameters and/or more accurate measurement. A location inside the tire allows tire gas temperature to be measured directly. The ability for relative movement of the sensor system relative to the tire allows an entire tire circumference to be scanned.

The parameter can be measured in various ways. Firstly, the parameter can be measured in any relative position of the sensor system and the wheel. This is appropriate for bulk properties such as tire gas pressure and tire gas temperature, which are generally constant regardless of the position that they measured in. Secondly, the parameter can be measured when the sensor system is positioned at a bottom of a wheel on which the tire is mounted. This is appropriate for measurements which rely on a position of the sensor system relative to the ground, such as a tire deflection. Thirdly, the parameter measurement can take place during rotation of the wheel and the comprises measuring the parameter for at least one complete rotation of the wheel. This is appropriate for parameters which vary over the tire, such as tire wall temperature and tire condition. The first, second and third ways of measuring can be combined.

Many different parameters can be measured using this method. Examples include:

the parameter comprises a distance and the characteristic comprises an aircraft loading. In this case, the distance may be indicative of a tire deflection due to contact with the ground. The parameter may also comprise a tire gas pressure and temperature.

the parameter comprises a tire gas pressure and a tire gas temperature, and the characteristic comprises temperature compensated tire pressure. Temperature compensated tire pressure is used to refer to tire pressure expressed at a predetermined, or reference, temperature.

the parameter comprises an acceleration and the characteristic comprises a landing force.

the parameter comprises a tire temperature and the characteristic comprises a tire condition.

the parameter comprises a reflection of an emitted signal by the tire and the characteristic is a tire condition. For example, the emitted signal may be a signal emitted by the sensor system.

the parameter comprises a distance and the characteristic comprises a tire tread depth. In this case, the distance may comprise a first distance measured to a reference point in the tire and a second distance measured to the ground.

The method may comprise taking action based on the characteristic. For example, the action may comprise: scheduling a maintenance action, such as tire inflation, manual tire inspection or tire replacement; providing an indication that maintenance of the tire is required; and providing data of the characteristic to another vehicle system, such as providing center of gravity data and/or loading data to an aircraft control system.

According to another aspect, a processing system is provided which is configured to execute the methods described above. The processing system may be part of the apparatus itself, or be a processor in a separate device that receives the data, directly or indirectly, from the apparatus.

According to a yet further aspect, there is provided an aircraft tire monitoring system. The aircraft tire monitoring system comprises: a wheel; a tire mounted on the wheel; a range sensor positioned inside the tire and configured for movement relative to the tire; and a processing system. The processing system is configured to: receive a measurement of a deflection of the tire from the range sensor; and determine an aircraft loading based on the received deflection. The processing system can be an internal processing system of a monitoring apparatus in the tire or an external processing system. Example external processing systems include a separate maintenance device and a cockpit information system.

Further features and advantages of the invention will become apparent from the following description of preferred embodiments of the invention, given by way of example only, which is made with reference to the accompanying drawings.

DETAILED DESCRIPTION

Figure 1:
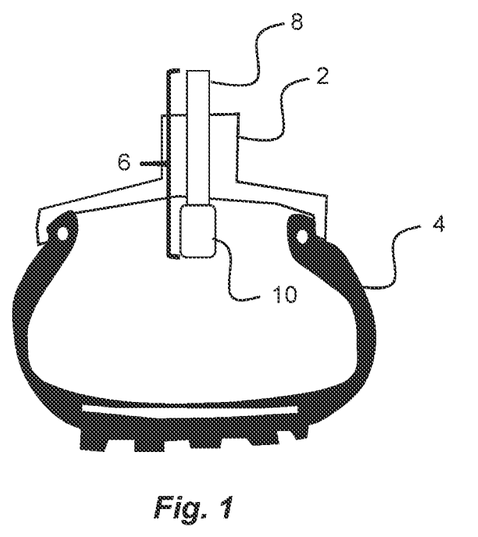
FIG. 1 shows a diagrammatic representation of a cross section through a system of an aircraft wheel, tire and apparatus according to embodiment.

FIG. 1 shows a diagrammatic representation of a cross section through a lower portion of a system according to an embodiment. The system comprises an aircraft wheel 2, an aircraft tire 4 and an apparatus 6 for monitoring the tire. The tire 4 is mounted on the wheel 2 in a conventional manner and the apparatus 6 is provided inside a tire cavity so that it is completely enclosed by the tire 4 and wheel 2 in use. The apparatus 6 comprises a mounting system 8 and a housing 10. The housing 10 contains various components to monitor the tire, which are described in more detail with reference to FIG. 4 below.

Figure 2:
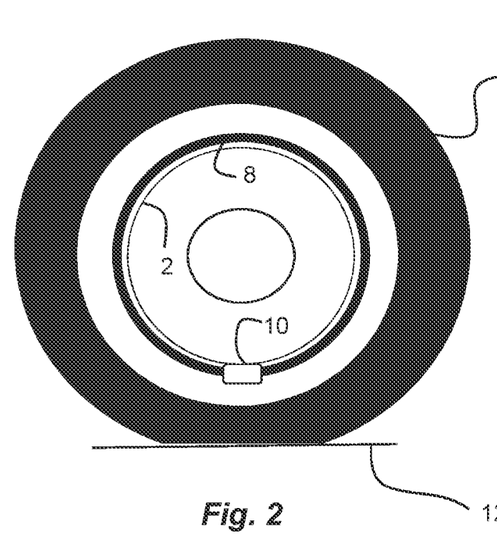
FIG. 2 shows a diagrammatic representation of a partially cut-away side view of the system of FIG. 1.
Figure 3:
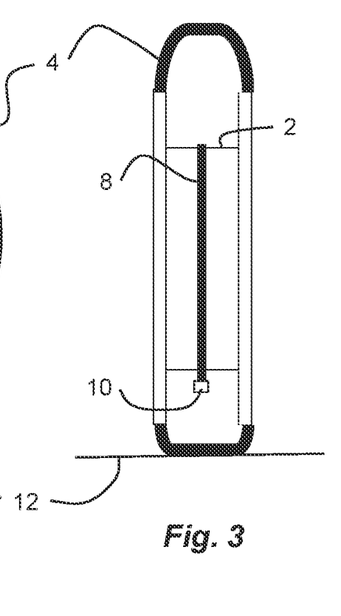
FIG. 3 shows a diagrammatic representation of a partially cut-away end view of the system of FIG. 1.

Referring now to FIGS. 2 and 3, which are side and end views of the system of FIG. 1 partially cut away so that the apparatus 6 can be seen in relation to the wheel 2 and tire 4, the mounting system 8 encircles an outer surface of the wheel 2. The mounting system is depicted schematically in FIGS. 1, 2 and 3 and takes the form of a continuous band or hoop to which the housing 10 is attached. The band is loosely in contact with the wheel 2 so that it can slip around the wheel in use. A PTFE coating is provided to lower the static and dynamic coefficient of friction between the band and the wheel 2. This means that, in use with the tire in contact with the ground, the weight of the housing 10 and the components within it acts to cause the band to rotate relative to the wheel 2, so that the housing 10 is positioned at the bottom of the wheel, generally facing the ground 12. FIGS. 2 and 3 depict a tire in contact with the ground 12 so that a bottom of the tire 4 is deflected under the weight of the aircraft. Positioning the housing 10 at the bottom of the wheel can allow this deflection to be measured and determine aircraft loading, center-of-gravity, and or tire tread depth as will be explained in more detail later.

The housing 10 rotates about the axis of rotation of the wheel under the action of gravity by its connection to the mounting system 8 and therefore can move relative to the wheel, and tire, as the wheel rotates. In this way, the housing 10 will pass by the entire wheel and tire as they rotate, enabling the entire tire to be monitored. This can enable specific locations on the tire to be monitored, rather than limiting to bulk properties when the sensor is fixed in a single position relative to the wheel.

Other examples may have other mounting systems. For example, the band may be fixed tightly to the wheel and the housing 10 forms part of a carriage which can translate along the track under the action of gravity and/or through a powered drive. Some examples may include features on the wheel itself to interact with the mounting system, such as circumferential ridges to assist locating the band on the wheel, or longitudinal ridges (parallel to the axis of rotation) to limit contact points between the band and wheel, therefore reducing friction. Further examples may have a track formed on the wheel itself, to which the housing 10 can be attached for translation, so that the band of the mounting system is not required. This flexibility in the mounting system enables the system to be incorporated in a wide variety of different aircraft models, either at the point of manufacture or as a retro-fit. A retro-fit application may use existing wheels or new wheels adapted for the mounting system as discussed above.

In examples where the mounting system comprises a track fixed to the wheel over which the housing travels, the track may comprise part of a rotary encoder so that the absolute position relative to the wheel can be determined. This may be useful to provide an indication of the position on the wheel where a parameter was measured and ensure that data of a complete rotation is obtained. Other examples may use one or more reference features on the wheel to track rotation, such as the location of a thermal fuse or may use an acceleration and/or velocity sensor to determine when a complete rotation has occurred.

Figure 4:
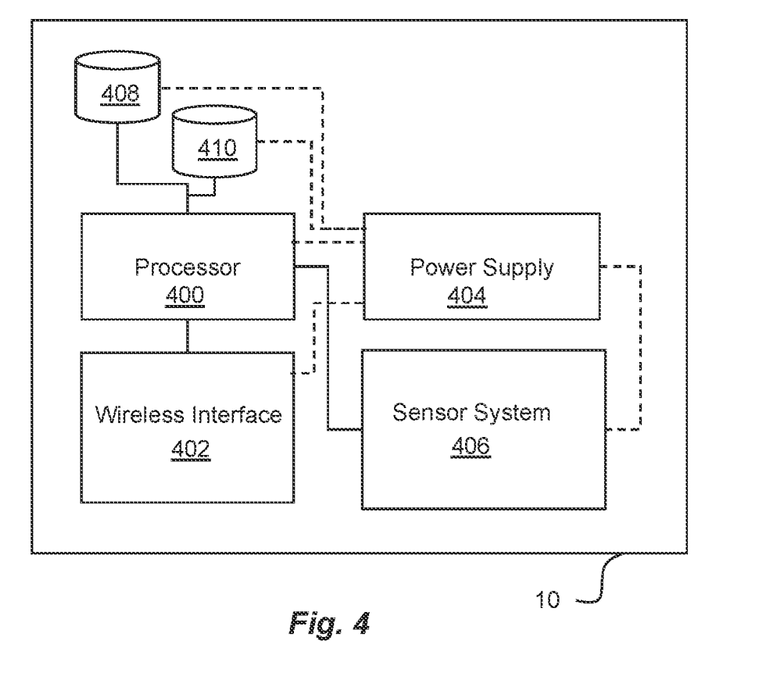
FIG. 4 shows a schematic representation of electronic components of the system of FIG. 1.

FIG. 4 shows a schematic representation of electronic components that are contained within the housing 10, for use in the system of FIG. 1. The electronic components comprise: a processor 400, a wireless communication interface 402, a power supply 404, a sensor system 406, a first storage 408 and a second storage 410.

Processor 400 may be any suitable processing device including a microprocessor with one or more processing cores. In use, processor 400 coordinates and controls the other components and may be operative to read and/or write computer program instructions and data from/to the storage 408, 410. The processor may be optimized for low power operation or have at least one processing core optimized for low power operation in some examples.

Wireless communication interface 402 is connected to the processor 400 and is used to both transmit and receive data, for example from other systems on other wheels of the aircraft, maintenance systems and aircraft control and information systems. The wireless communication interface 402 comprises a transceiver configured to use a standard according to IEEE 802.11 (WiFi) and to communicate on the 2.4 GHz or 5 GHz Industrial Scientific and Medical (ISM) bands. It may include an encryption module for encrypting sent data and decrypting received data, for example according to the Advanced Encryption Standard (AES) utilizing pre-shared keys. Other wireless standards may be used by the wireless communication interface including: a standard according to IEEE 802.15, such as Bluetooth®, IEEE 802.15.4, Near Field Communication (NFC), or Radio Frequency Identification (RFID).

The power supply 404 provides power to the electronic components. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the electronic components.

The sensor system 406 is connected to processor 400 and may comprise any suitable sensor. Example sensors include a pressure sensor, a temperature sensor, an accelerometer, a capacitance sensor, an optical sensor, a radio frequency sensor, an infrared sensor, a range sensor, an ultrasound sensor, a Surface Acoustic Wave (SAW) sensor, a vibration sensor and an acoustic sensor. Specific examples of the sensors and their use are discussed below with reference to FIGS. 5, 6A, 6B, 7 and 8 below.

The connection of the sensor system 406 to the processor 400 may be digital, providing a digital representation of the measured pressure and/or temperature from an Analogue to Digital Convertor (ADC) in the sensor itself, or analogue, in which case the processor may include an ADC to sample the received signal.

This example includes two storage elements 408 and 410. Storage 408 is non-volatile rewritable storage, such as flash memory which can retain data without requiring applied power. Other examples may include volatile storage, which is kept powered by the power supply, or combinations of read-only and rewritable storage. Storage 410 is connected to the processor 400 and used to store both computer program instructions for execution by the processor and data, such as data from the sensor system 406 or received over the wireless communication interface 402. In some examples, storage 410 may store a history of readings, measurements and/or data sensed by the sensor system 406. For example, the previous ten days' readings may be stored, with the newest data replacing the oldest once the storage is full. Storage 408 is secure storage to which write and/or read access is restricted, for example only accessible to certain processes running on processor 400. Configuration data, such as wireless encryption keys can be stored in storage 408. In other examples, a single storage may be provided, or storage 408 and 410 may be provided in a single physical device with a logical partitioning between storage 408 and storage 410.

Figure 5:
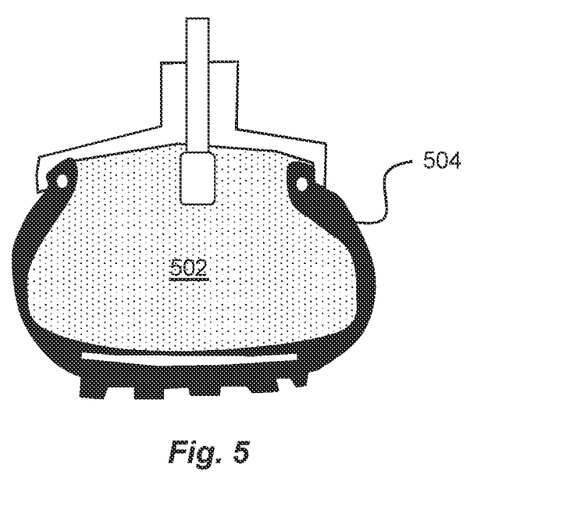
FIG. 5 shows a diagrammatic representation of using the system of FIG. 1 to measure a gas pressure and a gas temperature.

Referring now to FIG. 5, a diagrammatic representation of the measurement of tire gas properties is depicted. Tire gas properties are examples of bulk properties that are substantially the same in all locations within the tire. Tire gas is illustrated by the dotted area 502 in tire 504. The sensor system in the housing is positioned inside the tire and so can take a direct measurement of both tire gas pressure and tire gas temperature using suitable pressure and temperature sensors. A direct measurement of tire gas temperature allows the pressure to be expressed at a predetermined, or reference, temperature, assuming the volume of the tire is constant and the gas is an ideal gas. This can allow significant time savings over manual pressure measurement methods, where a tire is typically allowed to cool for three hours before its pressure can be measured, and also allow accuracy improvements over automated methods of gas pressure and gas temperature sensing which use indirect temperature sensing.

As the tire gas properties can be measured independent of the position of the sensor, they can be measured at regular intervals during all phases of flight, for example during flight itself when the undercarriage is lifted. This can allow a history of gas temperature and gas pressure to be gathered for all flight phases of an aircraft. For example, measurements could be taken every 20 minutes, every 10 minutes, every 5 minutes, every 2 minutes, or every minute.

Figures 6A, 6B:
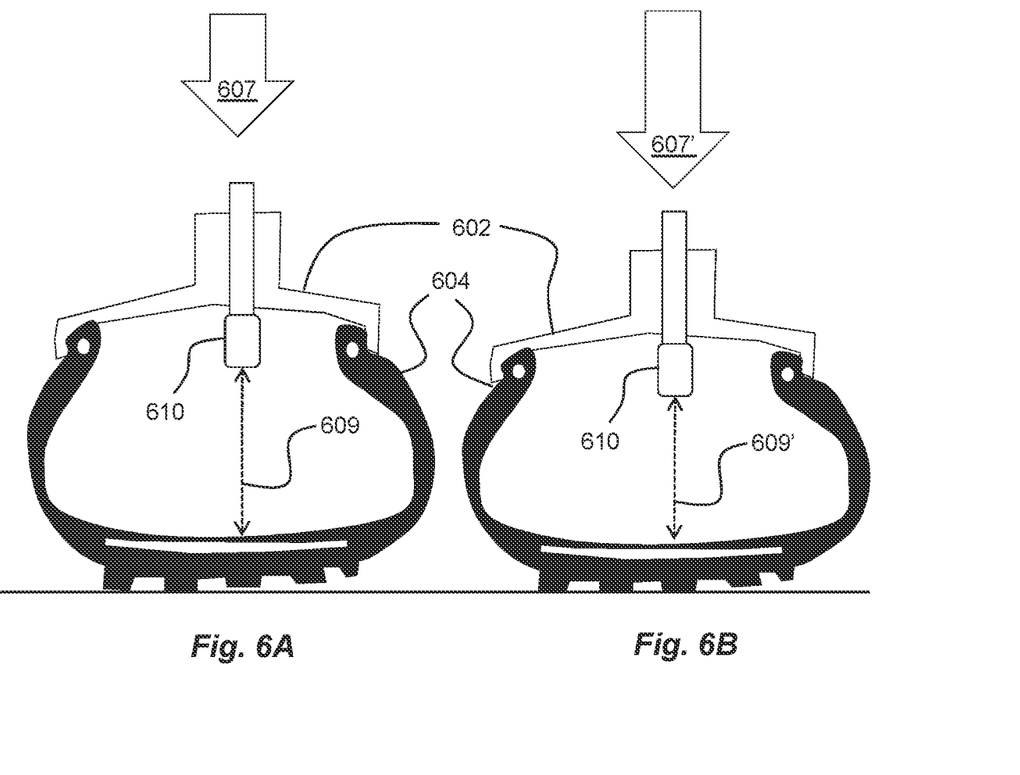
FIGS. 6A and 6B show diagrammatic representations of determining a tire deflection using the system of FIG. 1.

FIGS. 6A and 6B depict how the monitoring system can be used to measure a tire deflection distance when a housing 610 comprising a sensor system is positioned at a bottom of a wheel 602. The sensor system comprises a distance or range sensor, such as a laser or ultrasonic sensor which can use time of flight measurements and/or changes in phase from a reflection of an emitted signal to measure a distance to the point of reflection. The tire 604 comprises a reflective element within it which can reflect the signal from the distance sensor. In this example, the reflective strip is provided by the reinforcement band which is a metal braid and forms a part of the tire construction, depicted as a white element in tire 604. In other examples other elements may be used for reflecting the signal, for example an inner surface of the tire (the surface that faces the sensor) may be sufficiently reflective to the signal.

The distance sensor is directed radially outward from the axis of the wheel, so that it measures the radial distance to the reflective strip. The position of the sensor system at the bottom of the wheel could be verified using an accelerometer provided as part of the sensor system. At rest, the accelerometer will experience the force of gravity, so orientation relative to the ground can be determined from the direction of a gravity vector measured by the accelerometer. By determining the orientation of the accelerometer, the orientation of the distance sensor can be determined provided that the accelerometer and the distance sensor are fixed relative to each other. Other examples may determine position at a bottom of wheel in other ways, such as using an orientation sensor.

FIG. 6A depicts a tire 604 under a first load 607 and FIG. 6B depicts the tire 604 under a second load 607' which is greater than the first load 607. The deflection 609, 609' is measured by the distance sensor. Tire deflection 609, 609' is a function not only of the load 607, 607' but also on the tire gas pressure and potentially the construction of the tire. Preferably the tire gas pressure is also measured along with the deflection, but in other examples the tire gas pressure may be assumed to be the recommended pressure. The tire deflection and pressure can be converted into a load experienced by the wheel by consulting a look-up table stored in the memory 410. For example, a plurality of pressure and deflection values may be stored along with the associated aircraft load. The values in the look-up table may be determined experimentally, from a mathematical of the tire, from a mathematical relationship relating tire deflection, tire pressure and load. In other examples, the look-up table may be stored in a separate device in communication with the monitoring system via the wireless communication interface 402. Such separate devices can be, for example, another system in the aircraft, such as a cockpit information system, or a separate device from the aircraft, such as a portable maintenance device or a maintenance server system.

In some examples, a load is determined for all the tires on an aircraft. This can provide further useful information, including the total weight of the aircraft and the position of the aircraft's center-of-gravity. Data of an aircraft's weight is potentially valuable, for example to ensure that a maximum take-off weight is not exceeded. While it has been proposed to fit aircraft with axle-based load sensors, this requires fitting when the aircraft is built or provided with a major refit. The monitoring system of this example can provide load and weight data by an easy retrofit to existing aircraft.

In some examples, a calibration measurement may be taken when the wheel is in an unloaded condition. This can allow a "zero" or reference deflection measurement to be determined, so that deflection under load can then be expressed in terms of an amount a tire is deflected rather than a determined distance from the sensor to the reflective strip. An unloaded condition can be obtained by measuring the deflection while the aircraft is in the air, for example.

Figure 7:
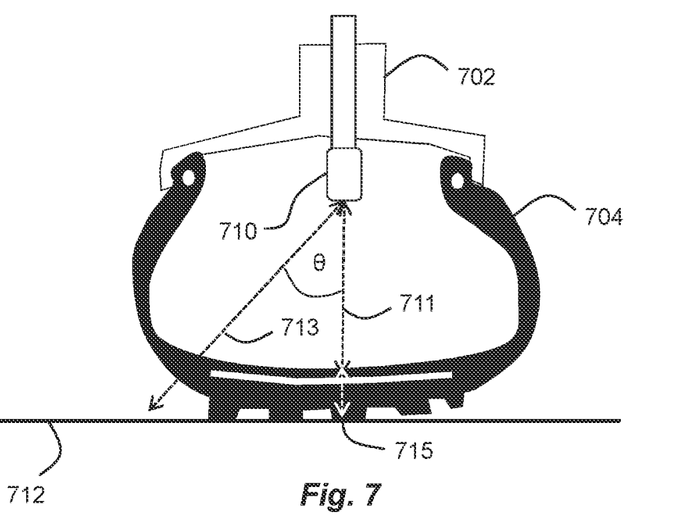
FIG. 7 shows a diagrammatic representation of using the system of FIG. 1 to determine a tire tread depth.

Referring now to FIG. 7, the system of FIG. 6 is extended to allow a measurement of tire tread depth. The system comprises a wheel 702, tire 704, and housing 710 comprising a sensor system. It is important that tire tread depth is maintained above a minimum acceptable value. It is known to manually measure the tread depth from the outside of the tire and/or use visual indicators incorporated into the tread pattern to ensure that the tread is above a predetermined minimum tread depth. As discussed above for FIGS. 6A and 6B a first distance sensor in the sensor system can measure the distance to a reflective element, such as a steel reinforcing belt within the tire. This in itself does not give data of tread depth, but in this example an additional, second distance sensor is provided in the sensor system. The second distance sensor is positioned at a predetermined angle $\theta$ to the first distance sensor for measuring tire deflection. $\theta$ is chosen so that the second distance sensor measures a distance to the ground, and so preferably it does not pass through the reflective element. In this example, the second distance sensor uses the same sensing technology as the first distance sensor and so should be positioned to avoid the reflective element and allow the signal to pass through the tire and be reflected by the ground.

In use, to measure the tread depth, it is first confirmed that the sensor system is at the bottom of the wheel. For example, an accelerometer can be used as previously discussed. Next, a first distance measurement is taken to the reflective element by the first distance sensor and a second distance measurement is taken by the second distance sensor. These measurements could be substantially simultaneous or carried out in any order. Trigonometry then gives the distance from the reflective element to the ground as follows:

$$h = L2 \cos \theta - L1$$

where L1 is a distance 711 measured by the first distance sensor, L2 is a distance 713 measured by the second distance sensor, $\theta$ is the angle between the first and second distance sensors and h is a distance 715 from the ground 712 to the reflective element.

The tread depth can be taken as h directly if the reflective element is positioned directly next to the tread. In other examples, the memory may store data of a distance from the reflective element to the start of the tread, which can then be subtracted from h to give the tread depth.

Tread depth can be measured at a single position around the wheel or at multiple positions. Multiple positions can be measured while the wheel is rotating and gravity maintains the sensor system at the bottom of the wheel, for example during a slow taxi which may be detected using the accelerometer. When multiple tread depth measurements are taken, a tread depth measurement may be associated with a particular position on the wheel by reading a rotary encoder provided on the mounting system or by using other reference features on the wheel as discussed above. Aircraft wheels are large, with circumferences as much as 4 m or larger. To accurately characterize the entire tire tread depth a relatively large number of readings may be required, for example 1,000 or more (corresponding to a space of approximately 4 cm between tread depth measurements). Tread depth is not necessarily constant around the circumference of the tire and "flat spots" where the tread depth varies may be detected with multiple tread depth readings at different positions.

In other examples, the second distance sensor may use a different technology than the first distance sensor. For example, the wireless communication interface may be used as a second distance sensor, looking for a reflection of a signal emitted by the wireless communication interface from the ground. In this case, the tire construction may be substantially transparent to a wireless communication signal. Example wireless communication signals that could be used include Bluetooth® and WiFi.

Figure 8:
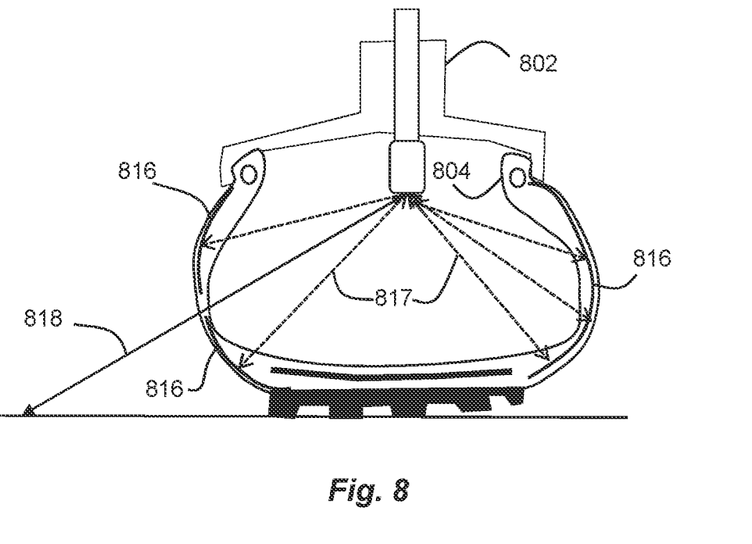
FIG. 8 shows a diagrammatic representation of using the system of FIG. 1 to determine a tire wall condition.

Other measurements can also be taken while the tire and wheel are rotating past the sensor system to characterize the tire and/or wheel. FIG. 8 depicts a schematic view of an example tire condition monitoring system according to an embodiment. A plurality of sensors are provided within a housing 810 oriented at different angles to the axis of a wheel 802. The plurality of sensors emit a signal and determine whether or not a reflection of the signal is received. A tire 804 is provided with a coating or element 816 which is reflective to the signal emitted by the plurality of sensors. In the case that tire condition is damaged or worn, the coating or element is thinned, or lost entirely, so a signal is not reflected back or is reflected back with a lower intensity in those locations. This is shown diagrammatically in FIG. 8 by the element 816 which reflects back signals 817, depicted as dashed arrows. The element 816 has a break at one point and so at that location does not reflect back a signal 818, depicted as a solid arrow, indicating potential damage or wear. This can detect damage which might be missed during a visual inspection, or which might not even be visible at the outside surface of the tire.

If any such damage or poor condition is detected, a flag may be set in memory to alert a maintainer when the system is next queried for monitoring or status data by a maintenance system. Alternatively, or additionally, the system may periodically broadcast an alert signal which can be received by other aircraft systems and acted on, for example providing an indication in a cockpit of the aircraft.

Other examples may detect damage by determining the capacitance of the tire and the incorporation of an electrically conductive layer in the tire. Still further examples may use ultrasound to examine the tire, potentially even scanning the internal structure of the tire for internal damage to reinforcement.

In other examples, the plurality of sensors may be movable to scan different positions on the tire and be adjusted to a new position after each rotation. Although this increases sensor complexity, it may be cheaper than a plurality of sensors. For example, during a 1 km taxi a 4 m circumference will rotate 250 times giving plenty of opportunity to scan different part of a tire on different rotations. In further examples, the plurality of sensors may include sensors which have an angular field of view, potentially reducing the number of sensors required.

The system can also monitor other aspects of the tire 804 while it rotates past the sensor. For example, the sensors may include an infra-red (IR) sensor or camera to determine the temperature of the tire 804. This can be advantageous to identify hot spots that might be indicative of a fault or damage to the tire.

Although FIG. 8 has been described as sensing parameters of the tire, 804, other examples can sense parameters of the wheel 802. For example, infra-red sensors or cameras, or other temperature or thermal sensors, can monitor the status of thermal plugs provided in the wheel 802. Thermal plugs are used to provide a safety mechanism; if the gas in the tire gets too hot, increasing the risk of a tire burst, the thermal plug melts to deflate the tire. However, even though the thermal plug may remain intact, the thermal cycling experienced by the plug can create thermal fatigue. By monitoring the thermal plug temperature, thermal events that may increase the risk of failure of the thermal plug, by increasing the risk of a failure due to thermal fatigue can be detected.

Still further embodiments can monitor additional parameters of a wheel and/or tire. If the sensor system includes an accelerometer, then the position of the sensor system inside the tire is well-suited to monitor hard landings. A hard landing can be potentially very damaging to an aircraft; following a hard landing strict safety checks are required before an aircraft can return to service. It is known to detect a hard landing manually, for example by a report from a pilot, or to use sensor data from accelerometers in other parts of the aircraft than the wheels. By detecting hard landings at the wheel itself, a more accurate acceleration reading can be obtained; it is closer to the tire/runway interface and therefore better suited to measure the force of the hard landing because it will be less damped by suspension than other parts of an aircraft.

While other forms of monitoring in this disclosure may use relatively low sampling or measurement rates, hard landing detection requires much faster sampling because of the very short time of the event. Sample rates of 500 to 1000 Hz are required for useful hard landing detection. This can increase power requirements if measured at all times. An alternative is to detect a hard landing by a signal provided by the accelerometer when it detects acceleration greater than a predetermined magnitude, such as greater than about 500 $ms^{-2}$ or greater than about 700 $ms^{-2}$. Such a signal may itself be indicative of a hard landing or may cause acceleration measurements to be taken at a sampling rate higher than 500 Hz for a predetermined period, such as 5 seconds, 4 seconds, 3 seconds, 2 seconds, or 1 second.

Figure 9:
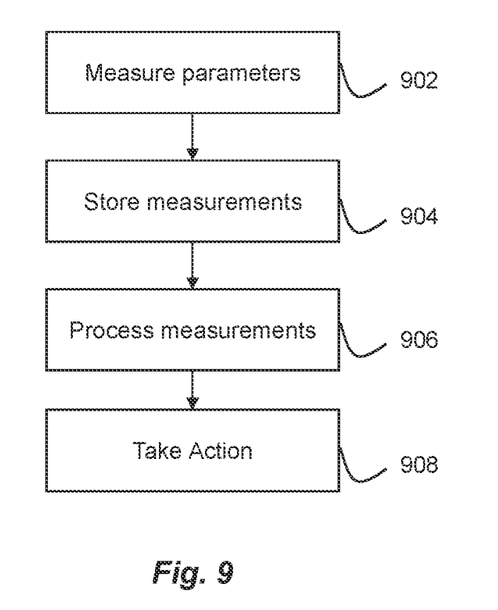
FIG. 9 is a flow diagram of a method of using the system of FIG. 1 for a single measurement to determine a characteristic of an aircraft.

FIG. 9 is a flow chart of method of monitoring a tire and/or wheel according to an example, which can be used for a single measurement where measurement location is not important. At block 902 the parameters are measured (for example tire gas temperature, tire gas pressure). Next, the measurements are stored in a memory at block 904. The measurements are then processed at block 906, for example by checking against acceptable thresholds for gas pressure, or by determining a loading from a tire deflection measurement. Finally, at block 908 an action is taken, such as transmitting the measurements or characteristics determined from the measurements to another device, or scheduling a maintenance action.

Figure 10:
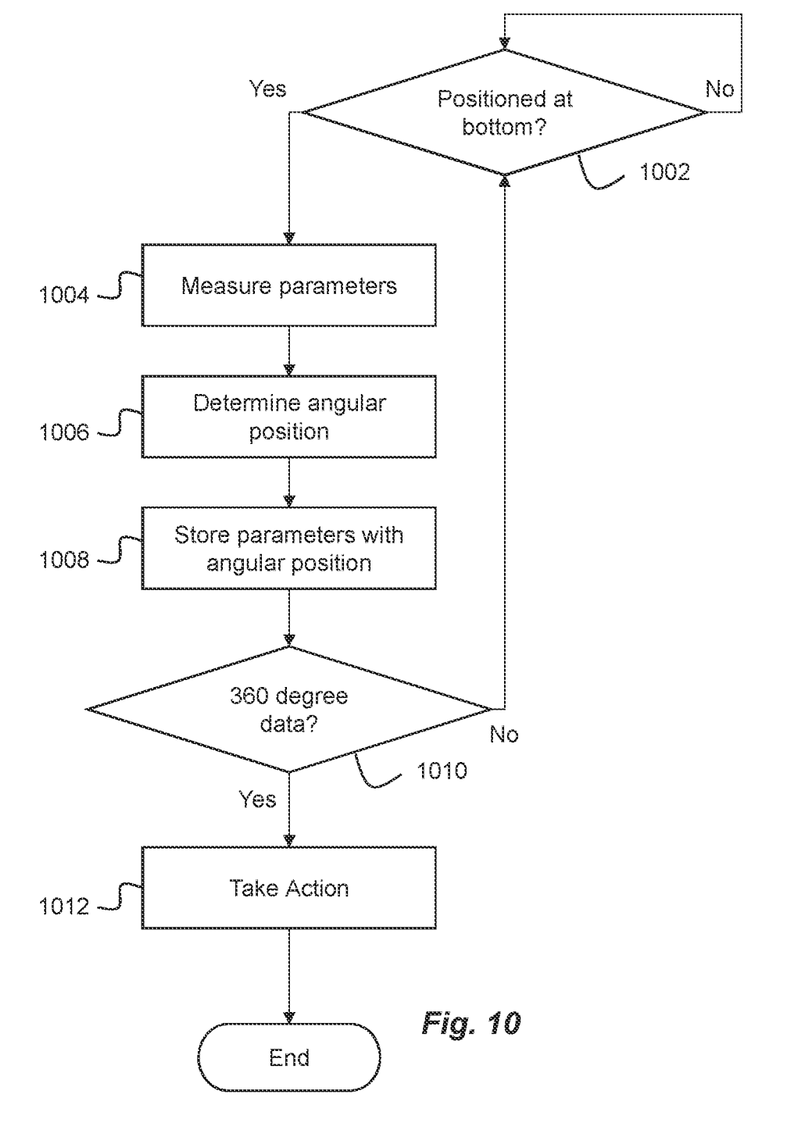
FIG. 10 is a flow diagram of a method of using the system of FIG. 1 for multiple measurements to determine a characteristic of an aircraft.

FIG. 10 is a flow chart of a method of monitoring a tire and/or wheel according to an example, which can be used for multiple measurements as a tire and wheel rotate past the sensor. First, at block 1002, it is determined whether a sensor is positioned at the bottom of the wheel, for example using an accelerometer. If it is determined that the sensor system is positioned at the bottom of the wheel then measurements are taken at block 1004, otherwise block 1002 repeats until the sensor system is positioned at the bottom of the wheel.

At block 1006, the angular position around the wheel is determined for example with reference to a rotary encoder associated with the mounting system or the wheel or a reference point on the wheel. The angular position is then stored with the measurements at block 1008 in memory. Next, at block 1010 it is determined whether data for a complete revolution of the tire has been gathered, such by referring the angular position data of stored measurements. If data of a complete revolution is stored, the method proceeds to block 1012, if data of a complete revolution is not stored, the method returns to block 1002 to take and store further measurements.

At block 1012, an action is taken, such as transmitting the measurements or characteristics determined from the measurements to another device, or scheduling a maintenance action. The method then ends.

Variations of the method of FIG. 10 are possible. For example, where measurements can be taken regardless of the position of the sensor relative to the ground block 1002 may be omitted and block 1010 can return to block 1004 if data of a complete revolution has not been obtained. This could be used for the condition sensing described above for FIG. 8, for example.

In other examples, block 1010 may check for data of a plurality of revolutions, for example at least 2, at least 5 or at least 10 revolutions. Data for each revolution can be stored individually as average values.

It will be appreciated that an angular position, such as recorded at block 1008, can be used for other purposes than determining that data has been gathered for a complete revolution of a tire. For example, this angular position can be used with tire tread depth data to determine flat spots, or with tire condition data to assist maintenance by indicating a position of possible tire damage.

Figure 11:
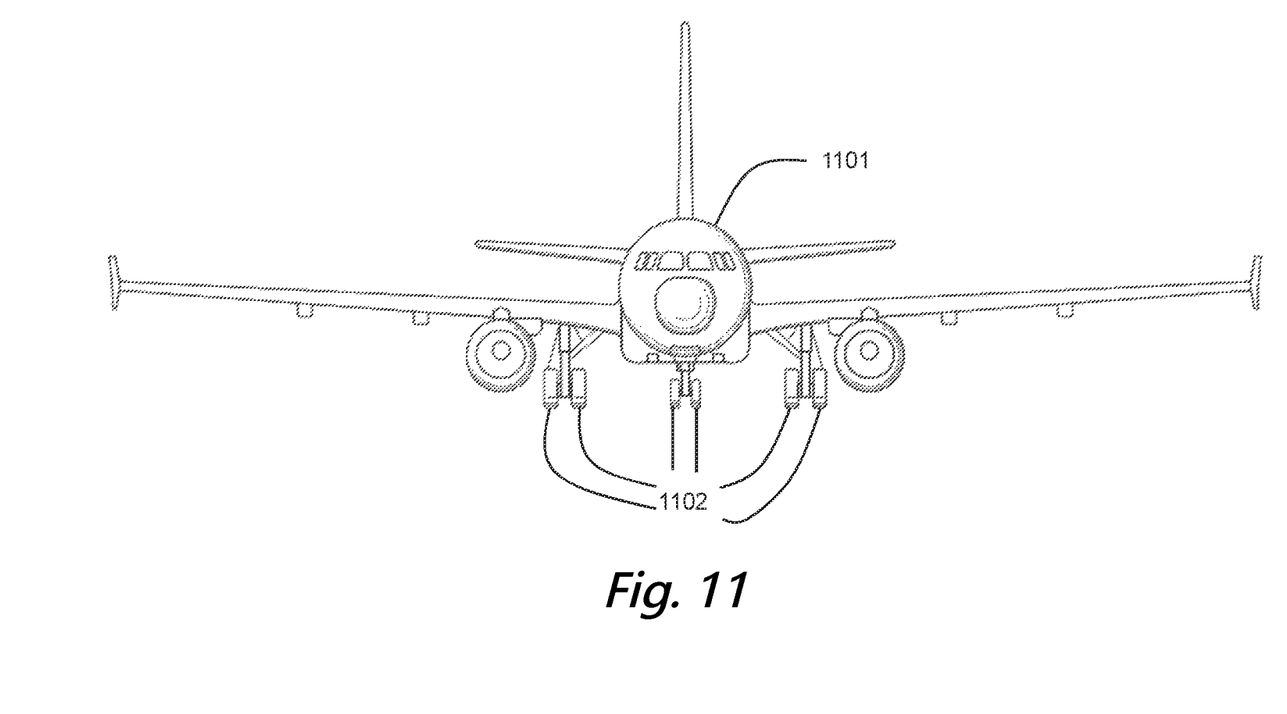
FIG. 11 shows a diagrammatic representation of an aircraft in which the system of FIG. 1 can be used.

FIG. 11 depicts an aircraft 1101 in which embodiments of the system may be implemented. The system of FIG. 1 is included in all the wheels 1102 of the aircraft 110. Each system can use its wireless communication interface to communication with systems in other wheels, external maintenance devices, or cockpit information systems.

Where methods have been described above, they can be implemented wholly in software, wholly in hardware (such as by an application specific integrated circuit) or any combination of software and hardware. A software implementation may comprise computer-readable medium comprising instructions that instruct a processor to carry out the method. The computer-readable medium may be a non-transitory computer readable medium.

It is to be noted that the term "or" as used herein is to be interpreted to mean "and/or", unless expressly stated otherwise.

The above embodiments are to be understood as illustrative examples of the invention. Further embodiments of the invention are envisaged. For example, although all the embodiments described above have a mounting system for relative movement between a sensor system and a wheel, other embodiments may have a fixed mounting between the sensor system and the wheel, with the sensor system contained within a cavity defined by the tire and the wheel. This can enable direct measurement of tire gas temperature, for example, unlike systems that uses a mounted port accessible external of the wheel. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for monitoring at least one of a tire and a wheel, the apparatus comprising:
a sensor system;
a wireless communication interface;
a processor connected to the sensor system and the wireless communication interface;
a power source; and
a mounting system for attaching within the tire the sensor system, the wireless communications interface, the processor and the power source to a wheel and configured to allow the tire to rotate relative to the sensor system,
wherein the sensor system includes at least one of a capacitance sensor, an optical sensor, a radio frequency sensor, an infrared sensor, a range sensor and an ultrasound sensor.

2. The apparatus according to claim 1, wherein the movement of the sensor system relative to the wheel in use is rotation about an axis.

3. The apparatus according to claim 1, wherein the mounting system defines a track around a wheel and the sensor system can translate along the track.

4. The apparatus according to claim 1, wherein the mounting system comprises a carriage for engaging a circumferential track provided on the wheel.

5. The apparatus according to claim 1, wherein the mounting system comprises a hoop-shaped band for mounting around a wheel, such that the hoop-shaped band can rotate about the wheel in use.

6. The apparatus according to claim 1, wherein the mounting system is configured to allow the sensor system to move relative to the wheel under the action of gravity so as to maintain the sensor system at a bottom of the wheel in use at least for wheel rotation speeds less than 60 revolutions per minute.

7. The apparatus according to claim 1, wherein the sensor system further comprises at least one of: a pressure sensor, a temperature sensor, an accelerometer.

8. A system comprising:
a wheel;
a tire affixed to the wheel; and
the apparatus according to claim 1 positioned inside the tire.

9. The system according to claim 8, wherein in use and with the wheel at rest the sensor system is positioned at the bottom of the wheel under the action of gravity.

10. An aircraft including the system according to claim 8.

11. A method of monitoring a tire on a vehicle, the method comprising:
providing a sensor system inside the tire and mounted such that the tire rotates relative to the sensor system;
measuring a parameter of the tire using the sensor system; and
using the measured parameter to determine a characteristic of the tire or the vehicle,
wherein the parameter includes a distance and the characteristic includes a loading of the vehicle.

12. The method according to claim 11, wherein the measuring the parameter takes place when the sensor system is positioned at a bottom of a wheel on which the tire is mounted.

13. The method according to claim 11, wherein the measuring the parameter takes place during rotation of the wheel and comprises measuring the parameter for at least one complete rotation of the wheel.

14. The method according to claim 11, wherein the measured parameter includes a second parameter which comprises gas pressure and gas temperature and the characteristic includes a second characteristic which comprises temperature-compensated tire pressure.

15. The method according to claim 11, wherein the parameter comprises acceleration and the characteristic comprises a landing force.

16. The method according to claim 11, wherein the parameter comprises tire temperature and the characteristic comprises a tire condition.

17. The method according to claim 11, wherein the parameter comprises a reflection of an emitted signal by the tire and the characteristic comprises a tire condition.

18. The method according to claim 11, wherein the parameter comprises the distance and the characteristic comprises the tire tread depth.

19. The method according to claim 11, further comprising taking action based on the characteristic.

20. An aircraft tire monitoring system comprising:
a wheel;
a tire mounted on the wheel;
a range sensor positioned inside the tire and mounted within the tire such that the tire rotates relative to the range sensor; and
a processing system configured to:
receive a measurement of a deflection of the tire from the range sensor; and
determine an aircraft loading based on the received deflection.

* * * * *